(12) United States Patent
Ngan

(10) Patent No.: US 7,353,001 B1
(45) Date of Patent: Apr. 1, 2008

(54) METHOD AND APPARATUS FOR MANAGING BEAM SELECTION IN A MOBILE HANDSET

(75) Inventor: John Cheong Wai Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 462 days.

(21) Appl. No.: 11/176,509

(22) Filed: Jul. 7, 2005

(51) Int. Cl.
*H04B 1/00* (2006.01)
*H04B 7/00* (2006.01)
*H04M 1/00* (2006.01)

(52) U.S. Cl. .................. 455/63.4; 455/562.1; 455/522

(58) Field of Classification Search ............. 455/562.1, 455/269, 522, 67.11, 134, 193.1, 575.7, 82, 455/83, 63.4, 63.1; 342/81, 154, 350
See application file for complete search history.

(56) References Cited

U.S. PATENT DOCUMENTS

| | | | |
|---|---|---|---|
| 6,337,659 B1 * | 1/2002 | Kim | 342/373 |
| 6,370,377 B1 * | 4/2002 | Take et al. | 455/432.1 |
| 6,711,382 B2 * | 3/2004 | Chiba et al. | 455/63.4 |
| 6,907,269 B2 * | 6/2005 | Yamaguchi et al. | 455/561 |
| 6,937,858 B2 * | 8/2005 | Take et al. | 455/432.1 |
| 7,062,273 B2 * | 6/2006 | Obayashi | 455/436 |
| 7,236,478 B2 * | 6/2007 | Wu et al. | 370/334 |
| 7,257,167 B2 * | 8/2007 | Lau | 375/295 |

OTHER PUBLICATIONS

Malika Greene, "Adaptive Antennas on Mobile Handsets," Radiocommunications Agency, Jun. 2002.

* cited by examiner

*Primary Examiner*—Sonny Trinh

(57) ABSTRACT

A method and apparatus for managing beam selection in a mobile station. The mobile station determines that, using a currently selected beam, the mobile station would have to transmit at too high of a power level in order to maintain a balance between a forward link path and a reverse link path. The mobile station computes a transmit power on the currently selected beam and compares the computed transmit power to a predefined threshold value. If the computed transmit power exceeds the predefined threshold value, the mobile station may switch to another beam. Otherwise, the mobile station will stay with the current beam, regardless of whether the current beam has the highest receive power.

20 Claims, 4 Drawing Sheets

METHOD AND APPARATUS FOR MANAGING BEAM SELECTION IN A MOBILE HANDSET

FIELD OF THE INVENTION

The present invention relates to wireless communications and, more particularly, to management of air interface communications between a mobile station and a base station.

DESCRIPTION OF RELATED ART

Cellular wireless is an increasingly popular means of personal communication in the modern world. People are using cellular wireless networks for the exchange of voice and data over cellular telephones, personal digital assistants ("PDAs"), cellular telephone modems, and other devices. In principle, a user can seek information over the Internet or call anyone over the public switched telephone network ("PSTN") from any place inside the coverage area of the cellular wireless network.

In a typical cellular wireless system, an area is divided geographically into a number of wireless coverage areas (such as cells and cell sectors), each defined by a radio frequency ("RF") radiation pattern from a respective base transceiver station ("BTS") antenna. The base station antennae in the wireless coverage areas are in turn coupled to a base station controller ("BSC"), which is then coupled to a telecommunications switch or gateway that provides connectivity with a transport network. For instance, the BSC may be coupled with a mobile switching center ("MSC"), which provides connectivity with the PSTN, and/or the BSC may be coupled with a packet data serving node (PDSN) that provides connectivity with the Internet.

When a mobile station (such as a cellular telephone, pager, or appropriately equipped portable computer, for instance) ("MS") is positioned in wireless coverage area, the MS and BTS can communicate with each other in various channels over the RF air interface. Communications from the BTS to an MS are considered to be in a "forward" direction, so the air interface channels used to carry such communications are referred to as the "forward link" channels. Conversely, communications from an MS to the BTS are considered to be in a "reverse" direction, so the air interface channels used to carry such communications are referred to as "reverse link" channels.

Traditional mobile stations include a fixed position antenna that radiates to provide both forward link and reverse link coverage. Typically, such an antenna would provide largely omni-directional or 360 degree coverage, to enable the mobile station to communicate with a base station regardless of the mobile station's physical orientation. Unfortunately, however, such a fixed beam antenna configuration tends to sacrifice signal strength for breadth of coverage.

To provide improved coverage, newer mobile stations may include an adaptive antenna system, such as a switched beam antenna. A switched beam antenna comprises a number of antenna elements that can be applied in various combinations and weights in order to produce different beams pointing in different directions.

A typical switched beam antenna, for instance, may include an array of antenna elements, and RF control logic in the mobile station may add together signals from some or all of the elements in phase or out of phase to produce a single beam direction. By applying complex weights and changing the combinations of antenna elements and phases, the mobile station can then change the beam direction.

Typically, a switched beam antenna system will define a discrete number of beams, each with a predefined combination or use of antenna elements. In operation, a mobile station equipped with such a system will periodically select a desired beam for use on both the forward and reverse link, by testing a received signal on all beams and selecting the beam that provides the highest received signal strength.

SUMMARY

The present invention stems from a realization that having a mobile station switch from one beam to another can, at least in theory, disrupt communications and be otherwise undesirable. The invention helps to solve that problem by conditioning a beam switch upon a determination that, using the currently selected beam, the mobile station would have to transmit at too high of a power level in order to maintain a balance between the forward and reverse links.

More particularly, when the mobile station is operating with a given one of its beams (e.g., one selected because it has the highest receive power), the mobile station will receive from the base station a set of control information including an indication of the base station's receive power and the base station's transmit power. Given knowledge of the base station's transmit power, the mobile station's receive power, and the base station's receive power, the mobile station can compute what mobile station transmit power would be necessary in order to balance the forward link path loss with the reverse link path loss—assuming (whether right or wrong) that forward and reverse transmission characteristics are substantially equivalent.

If the computed mobile station transmit power on the current beam would exceed a predefined threshold value (such as a maximum transmission power of the beam, or a designated percentage of that maximum transmission power), then the mobile station may switch to another beam, such as the beam that has the highest receive power. Otherwise, the mobile station will stay with the current beam, regardless of whether the current beam has the highest receive power.

This as well as other aspects, advantages, and alternatives will become apparent to those of ordinary skill in the art by reading the following detailed description, with reference where appropriate to the accompanying drawings. Further, it should be understood that the foregoing summary and the description provided below are set forth for purposes of example only and that many variations are possible, within the scope of the claims.

BRIEF DESCRIPTION OF THE DRAWINGS

An exemplary embodiment of the present invention is described herein with reference to the drawings, in which.

DETAILED DESCRIPTION

1. Exemplary Architecture

Figure 1:
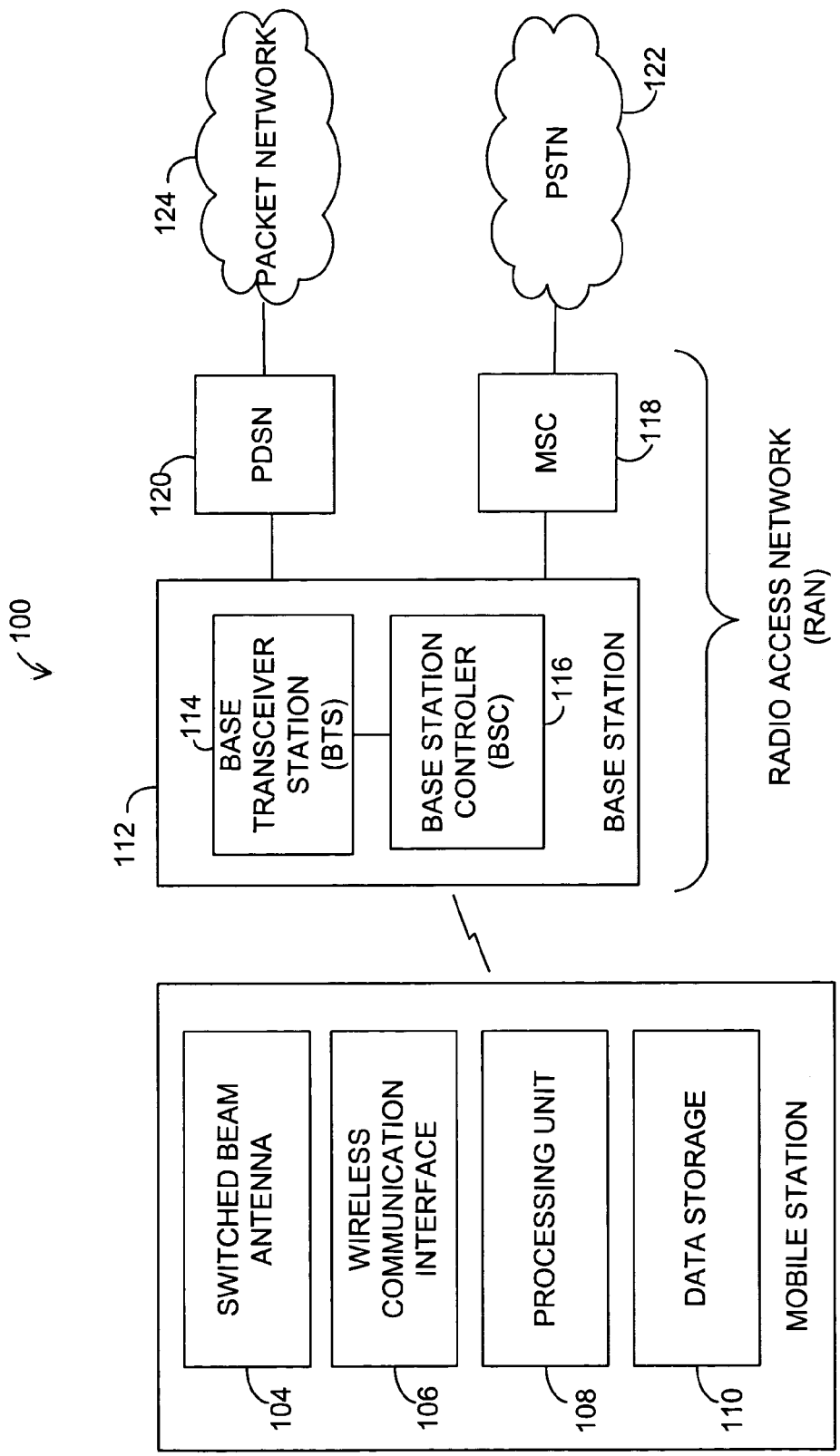
FIG. 1 illustrates a block diagram of a cellular wireless network arranged to carry out the exemplary embodiment.

FIG. 1 illustrates a simplified block diagram of a cellular wireless network in which an exemplary embodiment of the present invention may be employed. As shown in FIG. 1, the network may include a mobile station (MS) 102, a base station 112, a mobile switching center (MSC) 118, a packet data serving node (PDSN) 120, a public switched telephone network (PSTN) 122, and an internet protocol (IP) network 124. The base station 112 may be segmented into base transceiver station (BTS) 114, and a base station controller (BSC) 116. Further, the base station 112, MSC 118, and PDSN 120 may be collectively referred to as a radio access network (RAN). The arrangement and functionality of these components are well known in the art and therefore will not be described here in detail.

Preferably, the mobile station 102 includes a switched beam antenna 104, a wireless communication interface 106, a processing unit 108, and a data storage 110. The switched beam antenna 104 (also referred to as a switched beam antenna system 104) includes a number of antenna elements that can be applied in various combinations and weights in order to produce different beams pointing in different directions, allowing communication with base station 112.

The processing unit 108 may include one or more processors, such as a general purpose processor, special purpose processor, and/or a digital signal processor. Other types of processors may also be used.

The wireless communication interface 106 may be a wireless chipset, enabling air interface communication with a base station 112 according to a CDMA air interface protocol as set forth in TIA/EIA-95 or TIA/EIA/IS-2000. Other protocols may also be used.

The data storage 110 may be any medium or media, such as any volatile or non-volatile mass storage system, such as disc, tape storage drive, memory or other storage means readable by the wireless communication interface 106. Further, the data storage 22 may be an add-on module that is temporarily situated within or otherwise connected with the mobile station 102. The data storage 22 may be used to store data and/or machine-readable instructions.

The processing unit 108 may execute RF control logic (e.g., software routine and/or machine code) stored in data storage 110 to add together signals from some or all of the elements in phase or out of phase to produce a single beam direction on the switched beam antenna 104.

The mobile station 102 and the BTS 114 may use another technology, such as AMPS, TDMA, DECT, GSM, PCS, or PWT; the cellular technology used is not necessarily critical to the functioning of the present invention.

The BTS 114 preferably includes a transceiver and an antenna for communicating with mobile station 102. Further, the BTS 114 antenna may also be coupled to BSC 116. It is not necessary that BTS 114 and BSC 116 be separate entities, since the functionality of both a BTS 114 and BSC 116 may be integrated into one unit.

The MSC 118 may serve as an interface between base station 112 and PSTN 122. Similarly, PDSN 120 may serve as an interface between base station 112 and an IP network 124, such as an Intranet or the Internet. It is not necessary that BSC 116 and MSC 118 be separate entities, since the functionality of both a BSC 116 and an MSC 118 could be integrated into one unit.

For clarity only, multiple network entities, such as BTSs and BSCs, have been omitted from the drawings, although normally a network in which the invention may be implemented would include, for example, more than one BTS 114, MSC 118, mobile station 102, etc.

Figure 2:
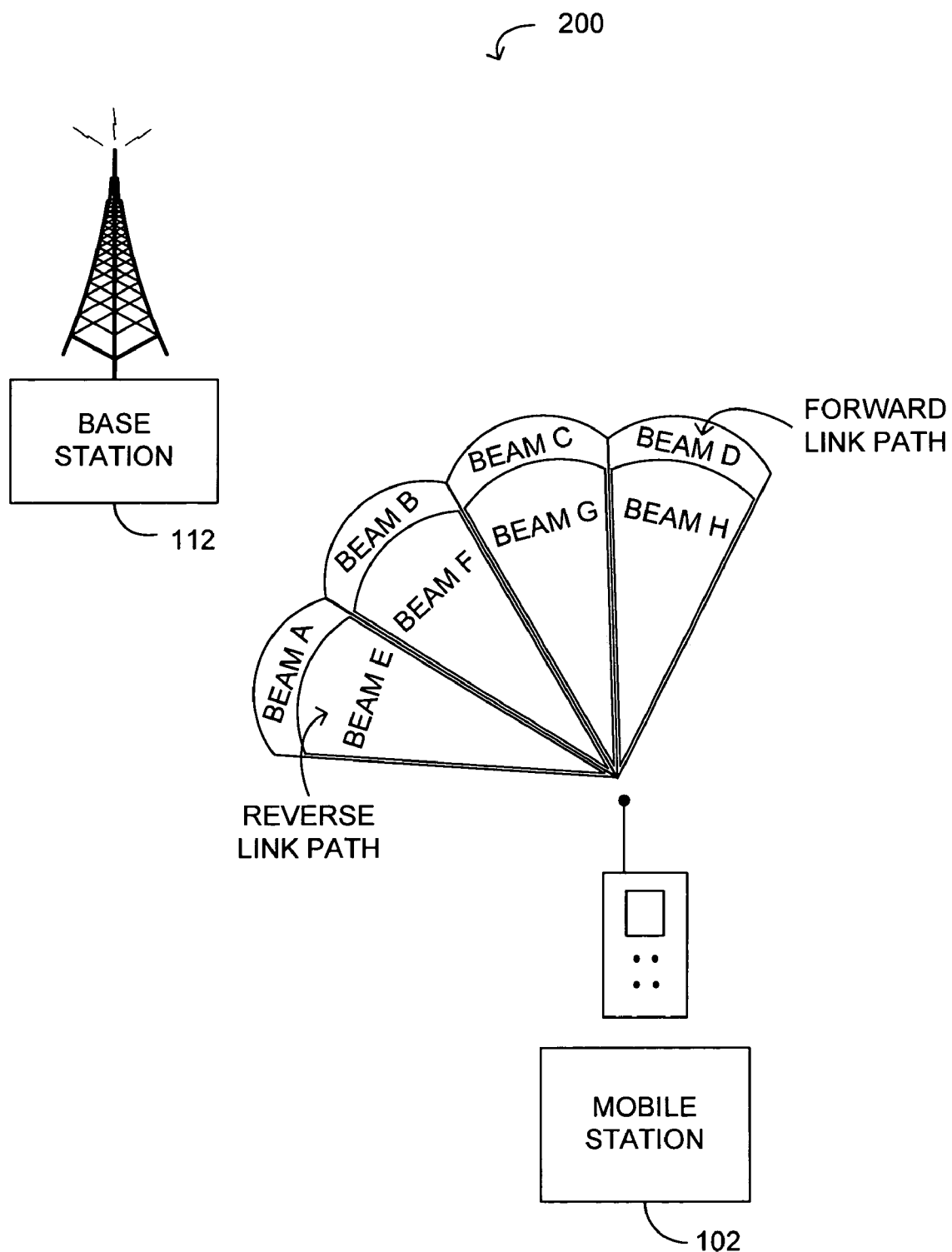
FIG. 2 illustrates multiple beams enabling communication between a mobile station and a base station in accordance with the exemplary embodiment.

Referring next to FIG. 2, an illustration 200 of multi-beam communication between the mobile station 102 and the base station 112 is provided. Beams A, B, C, D, E, F, G, and H are transmitted to enable communication between mobile station 102 and base station 112. The mobile station 102 is preferably equipped with a switched beam antenna 104. The base station 112 antenna may transmit beams A, B, C, and D to the mobile station 102 antenna in a forward direction, such that the air interface channels used to carry such communications may be referred to as forward link path channels. On the other hand, the mobile station 102 antenna may transmit beams E, F, G, and H to the base station 112 antenna in the reverse direction, such that the air interface channels used to carry such communications may be referred to as reverse link path channels. As an example, the mobile station 102 and the base station 112 may initially communicate with a predetermined beam A on the forward link path, and corresponding predetermined beam E on the reverse link path. If the mobile station 102 switches to another beam, the mobile station 102 may switch to (i) beam B on the forward link path, and corresponding beam F on the reverse link path, (ii) beam C on the forward link path, and corresponding beam G on the reverse link path, or (iii) beam D on the forward link path, and corresponding beam H on the reverse link path.

Figure 3:
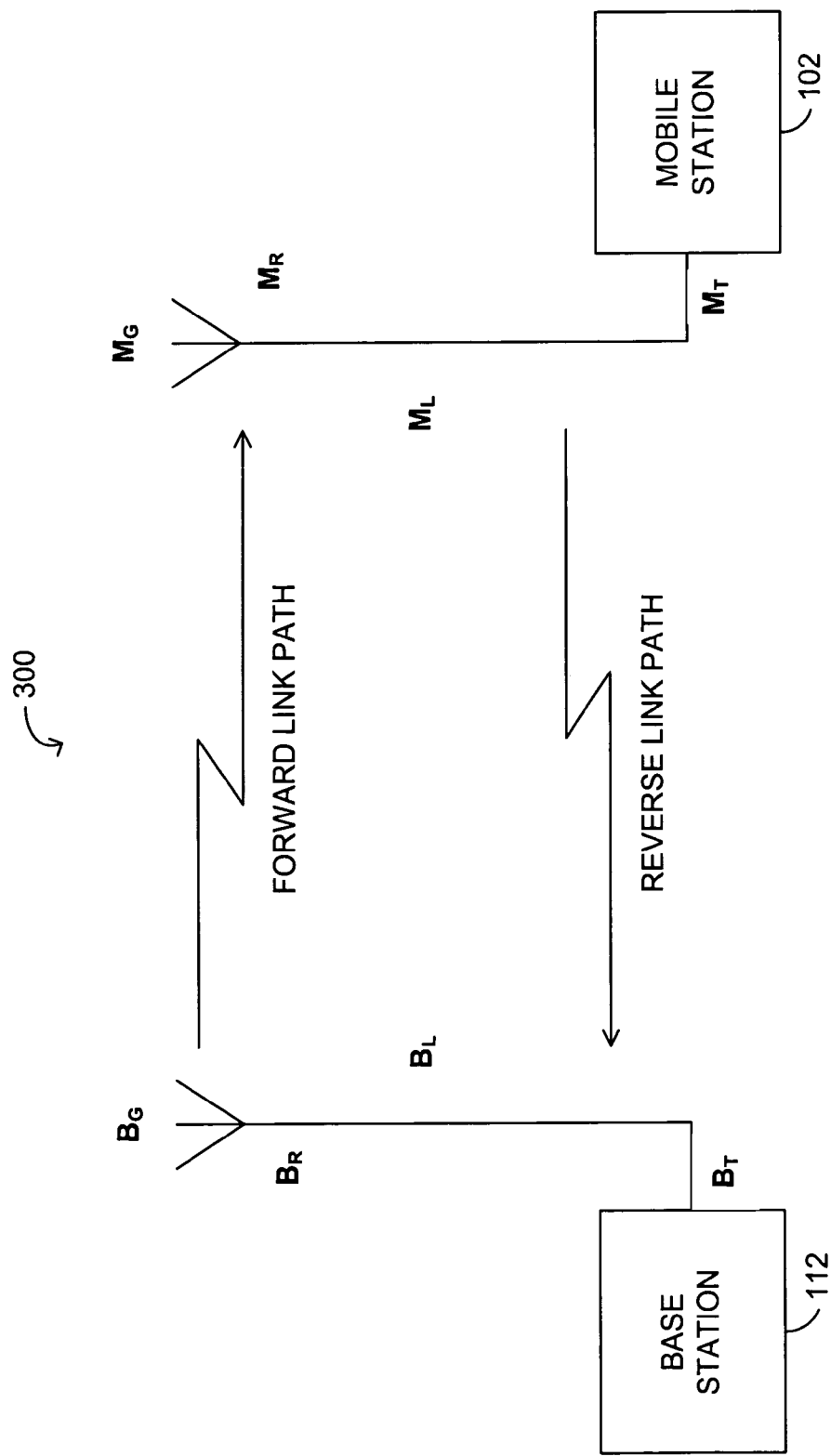
FIG. 3 illustrates operational parameters related to signaling on the communication path in accordance with the exemplary embodiment.

Referring next to FIG. 3, an illustration 300 of operational parameters related to signaling on the forward and the reverse link paths is provided. In FIG. 3, the base station 112 antenna may transmit a beam on the forward link path to the mobile station 102 antenna with signaling indicating operational parameters such as (i) a transmit power of the base station 112 antenna ($B_T$), (ii) a receive power of the base station 112 antenna ($B_R$), (iii) a gain due to amplification by the base station 112 antenna ($B_G$), (iv) a loss due to attenuation on the line between the base station 112 antenna and a base station 112 receiver ($B_L$). On the other hand, the mobile station 102 antenna may transmit a beam on the reverse link path to the base station 112 with signaling indicating operational parameters such as (i) a transmit power of the mobile station 102 antenna ($M_T$), (ii) a receive power of the mobile station 102 antenna ($M_R$), (iii) a gain due to amplification by the mobile station 102 antenna ($M_G$), and (iv) a loss due to attenuation on the link between the mobile station 102 antenna and a mobile station 102 receiver ($M_L$). The base station 112 may, for instance, transmit values for the operational parameters to the mobile station 102 in overhead control signaling, such as in a page message, an access probe acknowledgement message, or a traffic channel control message.

2. Overview of the Exemplary Operation

In accordance with the exemplary embodiment, the mobile station 102 learns the base station 112 values of $B_T$, $B_R$, $B_G$ and $B_L$. The base station 112 preferably transmits the value of $B_T$ to the mobile station 102 on the forward link path. For a given channel, the base station 112 will transmit to the mobile station 102 a power signal for the value of $B_T$, which is typically defined in part by a Digital Gain Unit ("DGU") parameter stored by the BSC 116. Preferably, the power signal transmitted to the base station 112 is the value $B_R$. Further, the values of $B_G$ and $B_L$ are characteristics of the base station 112 and are therefore specific to the base station 112 that transmits these values.

Figure 4:
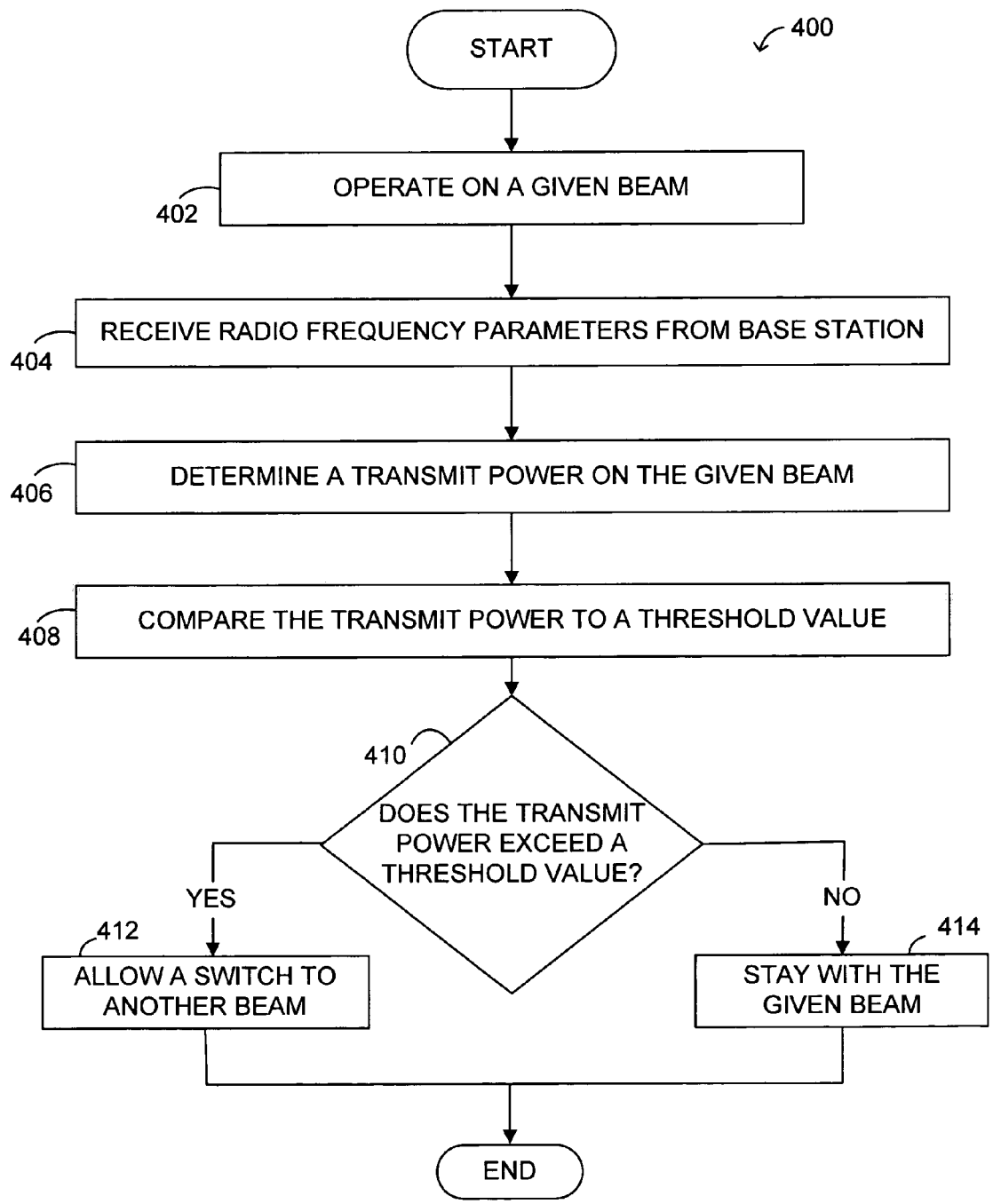
FIG. 4 depicts a flow chart of functions in accordance with the exemplary embodiment.

Referring next to FIG. 4, a generalized flowchart 400 of an exemplary embodiment is provided. At block 402, the process starts with mobile station 102 operating on a currently selected beam of a switched beam antenna 104 on the forward link path. The mobile station 102 may select the current beam because it has the highest receive power.

At block 404, the base station 112 transmits a signal to the mobile station 102. The signal indicates operational parameters such as (i) the transmit power of the base station 112 ($B_T$), and (ii) the receive power of the base station 112 ($B_R$). The operational parameters may also include (i) a gain of an antenna of the base station 112 ($B_G$), and/or (ii) a loss due to attenuation on the line between the base station 112 antenna and the base station 112 receiver ($B_L$).

At block 406, the mobile station 102 computes a transmit power for the currently selected beam of the switched beam antenna 104 by balancing the forward link path loss (FPL) with the reverse link path loss (RPL). By equating FPL with RPL, the mobile station 102 may determine what transmit power ($M_T$) is necessary to provide a balance between the FPL and RPL.

When FPL equals RPL, the mobile station 102 may compute the transmit power given that the mobile station 102 knows the values for $B_T$, $B_R$, and $M_R$. Alternatively, when FPL equals RPL, the mobile station 102 may compute the proposed transmit power ($M_T$) given that the mobile station 102 knows the values for $B_T$, $B_R$, $M_R$, $B_G$, $B_L$, $M_G$, and $M_L$.

At block 408, the mobile station 102 compares the computed mobile station 102 transmit power on the currently selected beam to a predefined threshold value. The predefined threshold may be a maximum transmission power on the beam or a designated percentage of that maximum transmission power. The maximum transmission power is the total power transmitted by the mobile station on the beam. The predefined threshold may also extend to lower thresholds.

In turn, at block 410, the mobile station 102 determines if the computed mobile station transmit power exceeds the predefined threshold for the currently selected beam. The computed transmit power may exceed the threshold by being (i) greater than or equal to the threshold, or (ii) greater than the threshold.

At block 412, the mobile station 102 may switch to another beam if mobile station 102 determines that the computed transmit power for the currently selected beam exceeds the predefined threshold. Otherwise, at block 414, the mobile station 102 will stay on the current beam, regardless of whether the current beam has the highest receive power.

3. Mathematical Description of the Exemplary Operation

The exemplary embodiment of the present invention, as illustrated in FIG. 4, will be described in mathematical detail below.

Discounting other factors and assuming for simplicity that the base station's transmit power is $B_T$, the mobile station's receive power is $M_R$, the mobile station's transmit power is $M_T$, and the base station's receive power is $B_R$, it follows that the forward link path loss, FPL, will be:

$$FPL=B_T-M_R$$

and the reverse link path loss, RPL, will be:

$$RPL=M_T-B_R.$$

Assuming, as desired, that the forward link path loss equals the reverse link path loss, it then follows that the mobile station 102 transmit power necessary to provide a base station 112 receive power of $B_R$ will be the sum of the forward link power and the base station 112 receive power, or:

$$M_T=B_T-M_R+B_R.$$

In accordance with the exemplary embodiment, the base station 112 will report its transmit power $B_T$ and receive power $B_R$ to the mobile station 102. The mobile station 102 will then use those values together with its receive power $M_R$ on its current beam to compute a necessary transmit power $M_T$ on that beam.

The mobile station 102 will then determine whether that value of $M_T$ exceeds a designated upper threshold. If the computed $M_T$ does not exceed the threshold, then the mobile station 102 will continue to use the current beam, regardless of whether the current beam has the highest receive power of the mobile station's beams. (In fact, in that scenario, the mobile station 102 may not even determine receive levels of its other beams.) On the other hand, if the computed $M_T$ would exceed the threshold, then the mobile station 102 may switch to another beam in any manner, such as by conventionally switching to the beam that has the highest receive power.

In a preferred embodiment, the mobile station 102 will take into account more than just transmit and receive power levels. In particular, the mobile station 102 will preferably consider the forward link path to extend from the base station 112 antenna to the mobile station 102 receiver, so that the forward link path loss will also include a gain $M_G$ and a loss $M_L$. Similarly, the mobile station 102 will preferably consider the reverse link path to extend from the mobile station 102 antenna to the base station 112 receiver, so that the reverse link path loss will also include a gain $B_G$ and a loss $B_L$.

Consequently, in the preferred embodiment, the equations for FPL and RPL will be:

$$FPL=B_T+M_G-M_L-M_R$$

and $$RPL=M_T+B_G-B_L-B_R.$$

In turn, it then follows that the mobile station 102 transmit power $M_T$ needed to have the base station 112 receive at receive-power $B_R$, with all other values being constant, would be:

$$M_T=B_T+M_G-M_L-M_R-B_G+B_L+B_R$$

In this preferred embodiment, as with the more generalized embodiment above, the mobile station 102 will compute its transmit power for its current beam and will determine if the computed transmit power exceeds a designated threshold. If the computed mobile station 102 transmit power does not exceed the exceed the threshold, then the mobile station 102 will continue to use the current beam, regardless of whether the current beam has the highest receive power of the mobile station's beams. On the other hand, if the computed $M_T$ would exceed the threshold, then the mobile station 102 may switch to another beam in any manner, such as by conventionally switching to the beam that has the highest receive power.

4. Conclusion

An exemplary embodiment of the present invention has been described above. Those skilled in the art will understand, however, that changes and modifications may be made to this embodiment without departing from the true scope and spirit of the present invention, which is defined by the claims. For example, although the invention has been described in the context of a switched beam system in a mobile station 102, the invention could equally be applied to other switched beam systems in other places, such as in a base station 112 or elsewhere. Other examples are possible as well.

I claim:

1. In a first communication device arranged to communicate over an air interface with a second communication device, wherein the first communication device includes a switched beam antenna system, a method of determining whether to switch from operating on a given beam of the switched beam antenna system to operating on another beam of the switched beam antenna system, the method comprising:
   receiving, on the given beam of the switched beam antenna system, signaling from the second communication device, wherein the signaling indicates operational parameters of the second communication device;
   using at least the indicated operational parameters of the second communication device as a basis to determine a proposed transmit power for the first communication device; and
   determining, based at least on the proposed transmit power, whether to switch over to use another beam of the switched beam antenna system.

2. The method of claim 1, wherein the first communication device is a mobile station, and the second communication device is a base station.

3. The method of claim 2, wherein the mobile station comprises a cellular telephone.

4. The method of claim 1, wherein receiving the signaling from the second communication device comprises receiving the signaling in an air interface control channel message or over an air interface traffic channel.

5. The method of claim 1, wherein the indicated operational parameters include (i) transmit power of the second communication device, and (ii) receive power of the second communication device.

6. The method of claim 5, wherein using at least the indicated operational parameters of the second communication device as a basis to determine the proposed transmit power for the first communication device comprises:
   determining the proposed transmit power based at least on (a) an assumption that path loss for communication from the first communication device to the second communication device equals path loss for communication from the second communication device to the first communication device, (b) the indicated operational parameters, and (c) a measured receive power of the first communication device.

7. The method of claim 5, wherein the indicated operational parameters further include (iii) gain of an antenna of second communication device, and (iv) loss between the antenna of the second communication device and a receiver of the second communication device.

8. The method of claim 7, wherein using at least the indicated operational parameters of the second communication device as a basis to determine the proposed transmit power for the first communication device comprises:
   determining the proposed transmit power based at least on (a) an assumption that path loss for communication from the first communication device to the second communication device equals path loss for communication from the second communication device to the first communication device, (b) the indicated operational parameters, and (c) a measured receive power of the first communication device.

9. The method of claim 1, wherein determining, based at least on the proposed transmit power, whether to switch over to use another beam of the switched beam antenna system comprises:
   making a determination of whether the proposed transmit power exceeds a threshold;
   if the determination is that the proposed transmit power does not exceed the threshold, then determining to not switch over to use another beam of the switched beam antenna system; and
   if the determination is that the proposed transmit power exceeds the threshold, then performing an operational comparison of beams of the switched beam antenna system to determine whether to switch over to using another beam of the switched beam antenna system.

10. The method of claim 9, wherein the threshold is set based on a maximum transmit power of the given beam of the switched beam antenna system.

11. The method of claim 9, wherein the threshold is a maximum transmit power of the given beam of the switched beam antenna system.

12. The method of claim 9, wherein the operational comparison of the beams comprises determining which beam has a highest received signal strength.

13. In a mobile station arranged to communicate over an air interface with a base station, wherein the mobile station includes a switched beam antenna system, a method of determining whether to switch from operating on a given beam of the switched beam antenna system to operating on another beam of the antenna system, the method comprising:
   receiving, on the given beam of the switched beam antenna system, signaling from the base station, wherein the signaling indicates at least a base station transmit power and a base station receive power;
   computing a proposed transmit power for the given beam of the switched beam antenna system, based at least on factors including the indicated base station transmit power, the indicated base station receive power, and mobile station receive power at the given beam of the switched beam antenna system,
   making a determination of whether the proposed transmit power exceeds a threshold;
   if the determination is that the proposed transmit power does not exceed the threshold, then determining to not switch over to use another beam of the switched beam antenna system; and
   if the determination is that the proposed transmit power exceeds the threshold, then performing an operational comparison of beams of the switched beam antenna system to determine whether to switch over to using another beam of the switched beam antenna system.

14. The method of claim 13,
   wherein signaling further indicates base station antenna gain and base station link loss, and
   wherein the factors include the indicated base station antenna gain, the indicated base station link loss, a mobile station antenna gain, and a mobile station link loss.

15. The method of claim 14, wherein computing the proposed transmit power based at least on the indicated base station transmit power, the indicated base station receive power, the indicated base station antenna gain, the indicated base station link loss, and the mobile station receive power at the given beam of the switched beam antenna system, comprises computing as the proposed transmit power as:
- the indicated base station transmit power,
- plus the mobile station antenna gain,
- minus the mobile station link loss,
- minus the mobile station receive power,
- minus the base station antenna gain,
- plus the base station link loss,
- plus the base station receive power.

16. The method of claim 13, wherein the operational comparison of the beams comprises determining which beam has a highest received signal strength.

17. The method of claim 13, wherein the mobile station comprises a cellular telephone.

18. The method of claim 13, wherein receiving the signaling from the base station comprises receiving the signaling in an air interface control channel message or over an air interface traffic channel.

19. A mobile station comprising:
- a switched beam antenna;
- a wireless communication interface;
- a processing unit; and
- a data storage,
- wherein the mobile station (i) receives, on a given beam of the switched beam antenna system, signaling from a base station, wherein the signaling indicates at least a base station transmit power and a base station receive power, (ii) computes a proposed transmit power for the given beam of the switched beam antenna system, based at least on factors including the indicated base station transmit power, the indicated base station receive power, and mobile station receive power at the given beam of the switched beam antenna system, (iii) makes a determination of whether the proposed transmit power exceeds a threshold, (iv) if the determination is that the proposed transmit power does not exceed the threshold, then determines to not switch over to use another beam of the switched beam antenna system, and (v) if the determination is that the proposed transmit power exceeds the threshold, then performs an operational comparison of beams of the switched beam antenna system to determine whether to switch over to using another beam of the switched beam antenna system.

20. The mobile station of claim 19, wherein the mobile station receives signaling from the base station over a CDMA air interface.

* * * * *